United States Patent [19]

Nels

[11] 4,105,102

[45] Aug. 8, 1978

[54] CLUTCH AND DAMPER ASSEMBLY

[75] Inventor: Terry E. Nels, Xenia, Ohio

[73] Assignee: General Motors Corporation, Detroit, Mich.

[21] Appl. No.: 768,738

[22] Filed: Feb. 15, 1977

[51] Int. Cl.² .............................................. F16D 3/14
[52] U.S. Cl. .................................................. 192/106.1
[58] Field of Search ............................. 64/27 C, 27 S; 192/106.1, 106.2

[56] References Cited

U.S. PATENT DOCUMENTS

| 3,327,820 | 6/1967 | Maurice | 192/106.2 |
| 3,809,198 | 5/1974 | Mori | 192/106.2 |

FOREIGN PATENT DOCUMENTS 1,200,013  7/1970  United Kingdom .................. 192/106.2

Primary Examiner—Gerald A. Dost
Attorney, Agent, or Firm—Donald F. Scherer

[57] ABSTRACT

A clutch and damper assembly wherein a single plate clutch has torsion springs and deformable resilient members, permitting a wide angle of travel, disposed between the clutch input and output to accommodate engine torsional vibrations imposed on the clutch. The torsion springs permit a predetermined amount of relative angular movement between the clutch input and output at a predetermined rate, and the resilient members become operable after the predetermined motion to permit further relative motion at a higher rate. A friction assembly included within the damper dissipates the periodic energy of the torsional vibrations.

4 Claims, 2 Drawing Figures

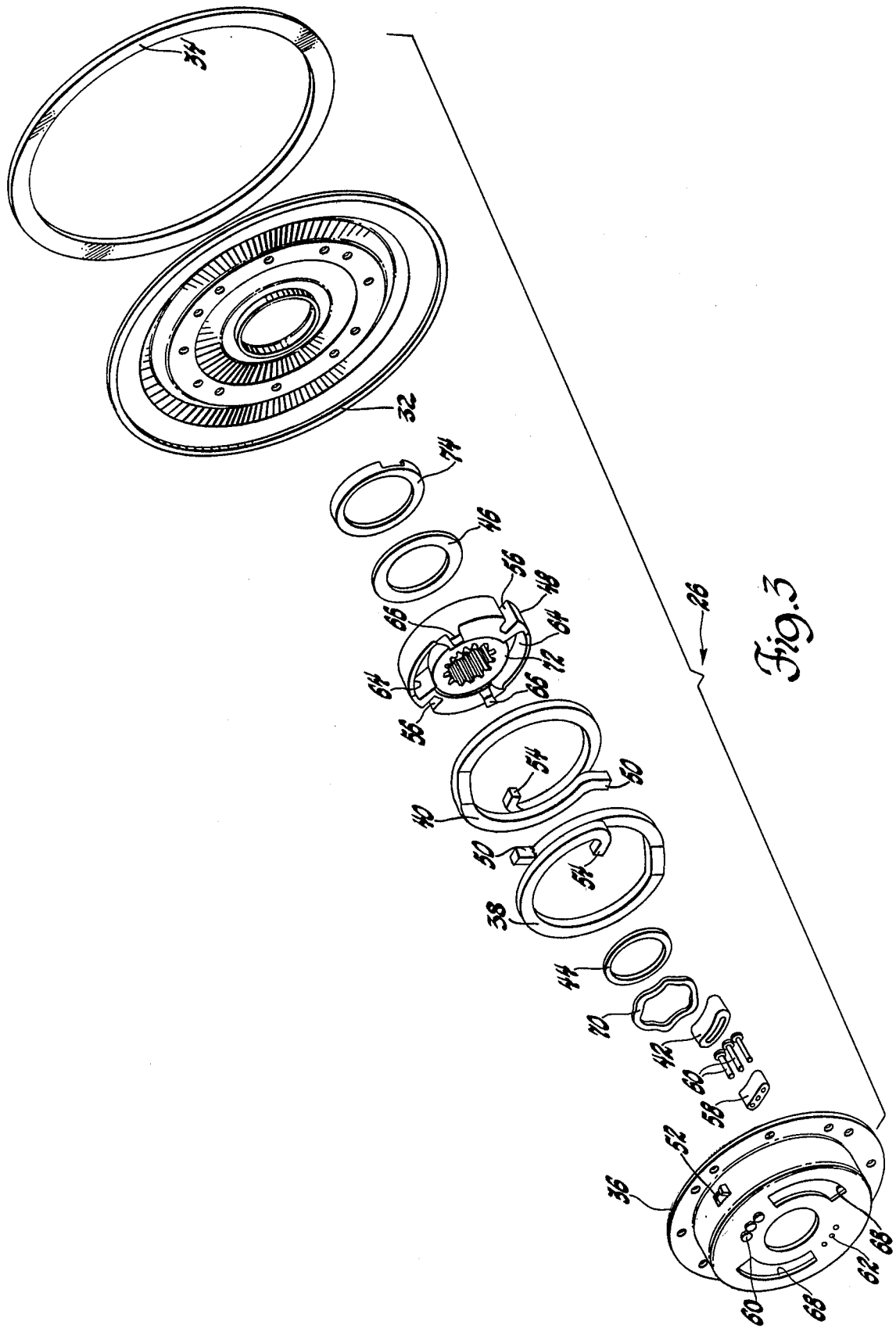

CLUTCH AND DAMPER ASSEMBLY

This invention relates to clutch dampers and more particularly to clutch dampers having at least two spring rates.

It is an object of this invention to provide an improved clutch damper having two predetermined spring rates and a wide angle of travel.

Another object of this invention is to provide an improved clutch damper wherein a first predetermined amount of travel is permitted by a torsion spring at one rate and a second predetermined amount of travel is permitted by the torsion spring and a deformable resilient member at a higher rate.

A further object of this invention is to provide an improved clutch damper wherein a pair of torsion springs having a spring rate are disposed between the clutch input and output to transmit drive therebetween while permitting a predetermined amount relative movement and a pair of deformable resilient members having a higher effective spring rate disposed between the clutch input and output and wherein the resilient members are operable to assist in transmitting drive torque after the predetermined amount of movements permitted by the torsion springs.

Other objects and advantages of the present invention will be more apparent from the following description and drawings in which:

FIG. 3 is an exploded perspective view of the clutch and damper assembly.

Figure 1:
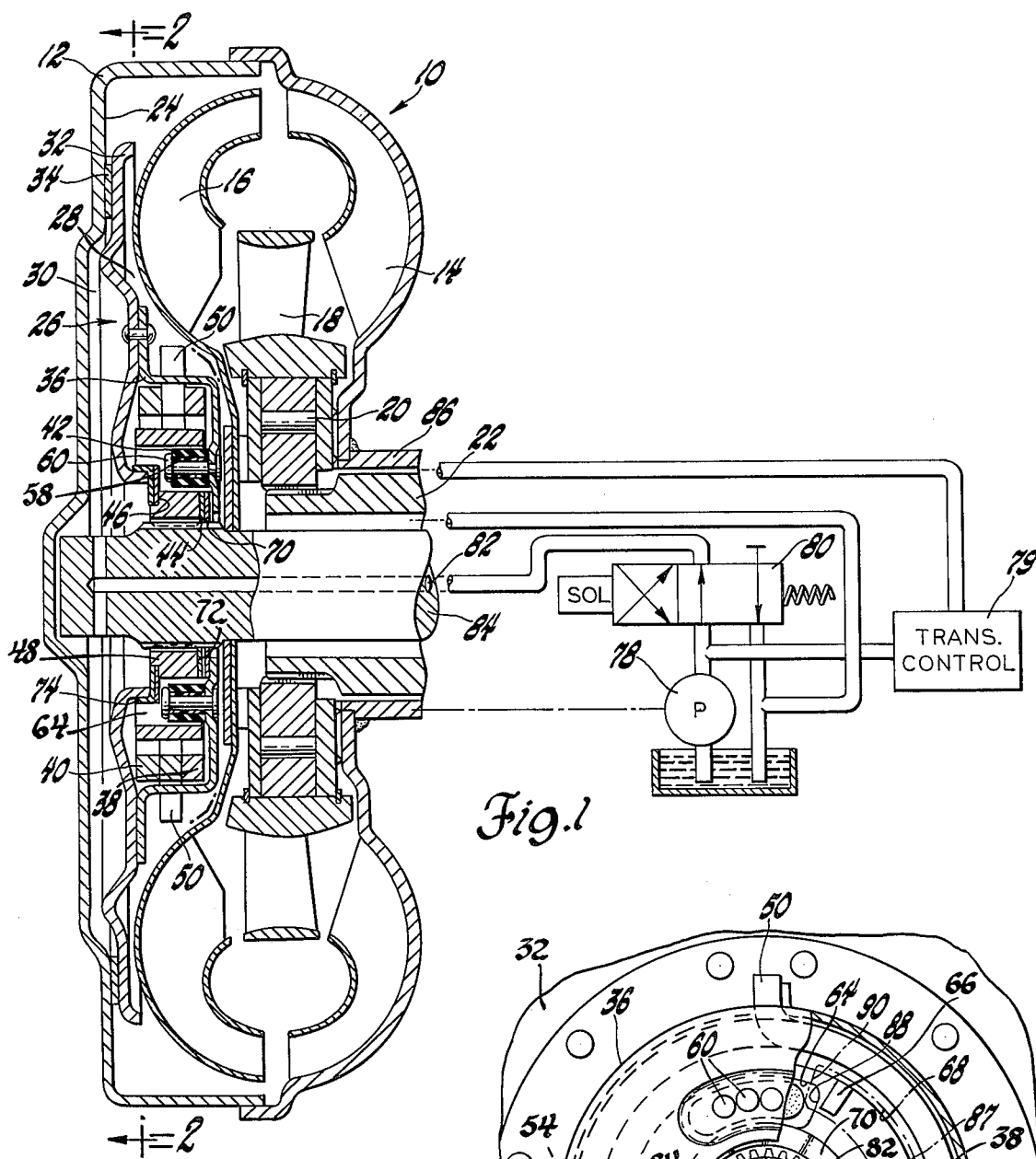
FIG. 1 is a cross-sectional side view of a torque converter, clutch and damper assembly.
Figure 2:
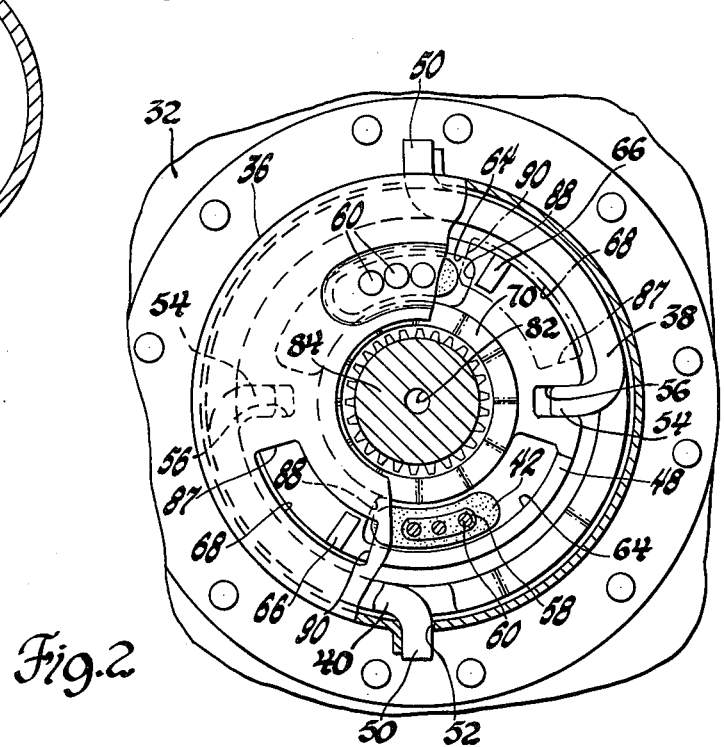
FIG. 2 is a view taken along line 2—2 in FIG. 1.

Referring to the drawings there is shown in FIG. 1, a torque converter generally designated 10 having an input shell 12, an impeller 14, secured to the input shell 12, a turbine 16, in toroidal flow relationship with the impeller 14, and a stator member 18 disposed in the toroidal flow path between the impeller 14 and turbine 16. The stator 18 is selectively connectable with ground through a conventional one way device 20 and a stator shaft 22 which is connected to the transmission housing, not shown, in the conventional manner. The input shell 12 is adapted to be connected to a prime mover, such as an internal combustion engine, not shown. An annular portion 24 of the inner surface of the input shell 12 is flat and provides a frictional surface adapted to be engaged by a friction clutch and damper assembly generally designated 26. The clutch and damper assembly 26 is disposed between the turbine 16 and the input shell 12 and cooperates with these members to form the clutch apply chamber or engagement chamber 28 and a disengagement chamber 30.

The clutch and damper assembly is best seen in FIG. 3. The clutch portion includes a pressure plate or input member 32 to which is bonded a friction facing 34. The friction facing 34, as seen in FIG. 1, is adapted to engage the surface 24 of input shell 12. The damper portion includes a retainer housing 36, a pair of torsion springs 38 and 40, a pair of resilient members 42, only one of which is shown, a pair of friction surfaces 44 and 46, and an output hub 48. The torsion springs 38 and 40 each have an outwardly extending drive member 50 which are adapted to fit in cooperating apertures such as 52 formed in retainer housing 36 and an inwardly extending drive member 54 which are adapted to be retained in radial slots 56 formed in the output hub 48.

The resilient member 42 is fitted on a relatively non-resilient member 58 which is secured to the retainer housing 36 by rivets 60 which pass through openings 62 formed in the retainer housing 36. Each of the resilient members 42 fit within arcuate slots 64 formed in the output hub 48. Also formed on the output hub 48 are a pair of axially extending circumferentially located drive lugs 66 which are disposed in a pair of arcuate openings 68 formed in the retainer housing 36. The friction member 44 is disposed between a spring washer 70 which abuts the retainer housing 38 and an annular surface 72 formed on the output hub 48. The friction member 46 is disposed between the output hub 48 and a hub 74 which is drivingly connected to the pressure plate 32. The spring washer 70 applies an axial force to the friction members so that a light friction connection is maintained between the clutch input and output.

The clutch assembly 26 is engaged and disengaged in a substantially conventional manner in which fluid pressure supplied by a pump 78 directs pressurized fluid to a conventional transmission control 79 and to a conventional solenoid operated spring set valve designated 80, which valve 80 may be controlled in any known manner to selectively supply fluid from the pump 78 through a passage 82 formed in a transmission shaft 84 which is drivingly connected to the turbine 16 and the output hub 48. The passage 82 is in fluid communication with the disengagement chamber 30. The torque converter is supplied with operating fluid from a conventional transmission control 79 as is well known. The fluid circulating within the torque converter is operable in the engagement chamber 28 to enforce engagement of the clutch 26 whenever the disengagement chamber 30 is exhausted by the control valve 80. The drive for the pump 78 is a conventional type drive which as is well known in the art is a drive connection between a shaft 86 secured to the impeller 14 and an internal external type gear pump.

When the clutch 26 is disengaged, the drive from the input shell 12 is through the torque converter 10 to the transmission shaft 84 in a well known manner. When the clutch 26 is engaged, the drive is from the input shell 12 through the clutch and damper assembly 26 to the transmission shaft 84. When the drive is through the clutch and damper assembly, it is necessary to absorb or otherwise eliminate the engine torsional vibrations which accompany the use of an internal combustion type engine. It has been found that it is desirable in lock up clutches of the type described herein that a wide angle damper travel is necessary to permit sufficient reduction in the engine torsional vibration so that the "syncromesh feel" is not present. To this extent, the torsional springs 38 and 40 provide a relatively large angular relative movement between the clutch input 32 and clutch output 48. These torsional springs 38, 40 provide approximately 35° of displacement before the higher rate resilient member 42 engages the surface of the arcuate slot 64 in the output hub 48. The resilient member 42 will permit an additional 5° of relative angular movement between the input and the output although this 5° of movement will be at a very high spring rate. At the end of this total movement permitted by the resiliency within the damper, the drive lugs 66 will engage the ends 87 of arcuate apertures 68 to provide a pure mechanical drive between the clutch input and output. However, in most driving conditions, this mechanical drive connection will not occur and is found in the system mainly to ensure that there is always available a drive connection between the input and output of the clutch. Thus it is seen that a first predetermined amount of relative angular movement is permitted at a predetermined rate by the torsion springs 38 and 40, a second predetermined amount of relative angular movement is permitted at a higher predetermined rate dependent on the resilient properties of both the torsion springs 38 and 40 and the resilient member 42. The resilient member 42 is preferably a rubber type member however any of the well known deformable materials can be used in dampers of this type.

During a coasting type situation, that is where the engine is being driven by the vehicle, the back drive through the damper is taken up initially by the rubber resilient member 42 abutting the output hub 48 at the ends 88 of slot 64. If further relative movement is attempted, the drive lugs 66 will abut the end 90 of the arcuate slot 68 to provide a pure mechanical drive.

Obviously, many modifications and variations are possible in light of the above teaching. It is, therefore, to be understood that within the scope of the appended claims the invention may be practiced otherwise than is specifically described.

What is claimed is:

1. A clutch and damper assembly comprising; a clutch input member having a friction surface thereon; a clutch output member having an arcuate recess formed therein and a drive lug formed thereon; a retainer housing secured to said clutch input member and enclosing said clutch output member and having an arcuate opening therein into which said drive lug extends normally out of contact with said retainer housing; a first torsion spring and a second torsion spring disposed within said retainer housing and each torsion spring encircling said clutch output member, each torsion spring having first drive end means connected to said retainer housing and second drive end means drivingly connected to said clutch output member; deformable resilient means secured to said retainer housing and extending into said arcuate openings in said clutch output member; and energy absorbing friction means disposed between said clutch input member and said clutch output member; each of said torsion springs permitting a predetermined amount of relative angular movement between said clutch input member and said clutch output member at a predetermined rate, and said deformable resilient means contacting said clutch output member after said predetermined amount of said relative angular movement and thereafter permitting further relative angular movement of a second predetermined amount at a higher predetermined rate, and said drive lug contacting said retainer housing after said second predetermined amount of relative angular movement thereby providing a positive drive connection between said clutch input and output members.

2. A clutch and damper assembly comprising; a clutch input member having a friction surface thereon; a clutch output member having an arcuate recess formed therein; a retainer housing secured to said clutch input member and enclosing said clutch output member; a first torsion spring and a second torsion spring disposed within said retainer housing and each torsion spring encircling said clutch output member, each torsion spring having first drive end means connected to said retainer housing and second drive end means drivingly connected with said clutch output member; deformable resilient means secured to said retainer housing and extending into said arcuate openings in said clutch output member; and energy absorbing friction means disposed between said clutch input member and said clutch output member; each of said torsion springs permitting a predetermined amount of relative angular movement between said clutch input member and said clutch output member at a predetermined rate, and said deformable resilient means contacting said clutch output member after said predetermined amount of said relative angular movement and thereafter permitting further relative angular movement of a second predetermined amount at a higher predetermined rate.

3. A clutch and damper assembly comprising; a clutch input member having a friction surface thereon; a clutch output member having an end face with arcuate recesses formed therein, radial drive slots formed between said recesses and a drive lug formed thereon; a retainer housing secured to said clutch input member and enclosing said clutch output member and having an end face with an arcuate opening therein into which said drive lug extends normally out of contact with said retainer housing and a cylindrical surface having apertures therein; first and second torsion spring means disposed within said retainer housing and encircling said clutch output member, each spring means having a radially outwardly extending drive end disposed in said apertures in said cylindrical surface on said retainer housing and a radially inwardly extending drive end disposed in said drive slots in said clutch output member; deformable resilient means secured to said retainer housing and extending into said arcuate openings in said clutch output member; and energy absorbing friction means disposed between said clutch input member and said clutch output member; said torsion spring means permitting a predetermined amount of relative angular movement between said clutch input member and said clutch output member at a predetermined rate, and said deformable resilient means contacting said clutch output member after said predetermined amount of said relative angular movement and thereafter permitting further relative angular movement of a second predetermined amount at a higher predetermined rate, and said drive lug contacting said retainer housing after said second predetermined amount of relative angular movement thereby providing a positive drive connection between said clutch input and output members.

4. A clutch and damper assembly comprising; a clutch input member having a friction surface thereon; a clutch output member having an end face with arcuate recesses formed therein, radial drive slots formed between said recesses; a retainer housing secured to said clutch input member and enclosing said clutch output member and having an end face with a cylindrical surface having apertures therein; first and second torsion spring means disposed within said retainer housing and encircling said clutch output member, each spring means having a radially outwardly extending drive end disposed in said apertures in said cylindrical surface on said retainer housing and a radially inwardly extending drive end disposed in said drive slots in said clutch output member; deformable resilient means secured to said retainer housing and extending into said arcuate openings in said clutch output member; and energy absorbing friction means disposed between said clutch input member and said clutch output member; said torsion spring means permitting a predetermined amount of relative angular movement between said clutch input member and said clutch output member at a predetermined rate, and said deformable resilient means contacting said clutch output member after said predetermined amount of said relative angular movement and thereafter permitting further relative angular movement of a second predetermined amount at a higher predetermined rate.

* * * * *